(12) United States Patent
Messner et al.

(10) Patent No.: US 11,121,645 B2
(45) Date of Patent: Sep. 14, 2021

(54) POWER TRANSMISSION VIA A BIPOLAR HIGH-VOLTAGE DC TRANSMISSION LINK

(71) Applicant: SIEMENS AKTIENGESELLSCHAFT, Munich (DE)

(72) Inventors: Johann Messner, Erlangen (DE); Nicolas Soellner, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/766,436

(22) PCT Filed: Nov. 22, 2017

(86) PCT No.: PCT/EP2017/080108
§ 371 (c)(1),
(2) Date: May 22, 2020

(87) PCT Pub. No.: WO2019/101306
PCT Pub. Date: May 31, 2019

(65) Prior Publication Data
US 2021/0036634 A1    Feb. 4, 2021

(51) Int. Cl.
*H02J 3/36*        (2006.01)
*H02M 7/757*    (2006.01)
(Continued)

(52) U.S. Cl.
CPC ............. *H02M 7/7575* (2013.01); *H02J 3/36* (2013.01); *H02M 7/77* (2013.01); *H02M 1/36* (2013.01)

(58) Field of Classification Search
CPC ............ H02J 3/36; H02M 1/36; H02M 7/757; H02M 7/7575; H02M 7/77
See application file for complete search history.

(56) References Cited

U.S. PATENT DOCUMENTS 3,526,780 A * 9/1970 Danfors ................... H02J 3/36
307/82
3,641,356 A * 2/1972 Ekstrom .............. H02H 7/1206
307/64
(Continued)

FOREIGN PATENT DOCUMENTS

JP         H11252790 A      9/1999

OTHER PUBLICATIONS

PCT International Search Report and Written Opinion of International Searching Authority dated Jul. 31, 2018 corresponding to PCT International Application No. PCT/EP2017/080108 filed Nov. 22, 2017.

*Primary Examiner* — Fred E Finch, III
(74) *Attorney, Agent, or Firm* — Laurence A. Greenberg; Werner H. Stemer; Ralph E. Locher

(57) ABSTRACT

A converter station has two line-commutated converters for energy transmission via a bipolar high voltage direct current transmission line. In a first operating mode of the converter station the two converters are electrically connected in an anti-parallel circuit to the same pole of the high voltage direct current transmission link and one of the converters is operated as a rectifier and the other converter is operated as an inverter in an network. In a second operating mode the two converters are connected to different poles of the high voltage direct current transmission link and both converters are operated as either rectifiers or inverters in the AC network. In both operating modes a station active power exchanged between the converter station and the AC network is controlled by active power specifications for converter active powers which are exchanged between the converters and the AC network.

14 Claims, 2 Drawing Sheets

(51) Int. Cl.
  *H02M 7/77*  (2006.01)
  *H02M 1/36*  (2007.01)

(56) References Cited

U.S. PATENT DOCUMENTS

| | | | | |
|---|---|---|---|---|
| 3,968,419 | A | | 7/1976 | Ekstrom |
| 4,133,026 | A | * | 1/1979 | Hausler .................... H02J 3/36 |
| | | | | 363/49 |
| 4,429,357 | A | * | 1/1984 | Hausler ............... H02M 7/7575 |
| | | | | 363/35 |
| 2009/0168473 | A1 | * | 7/2009 | Karlsson .................. H02J 3/38 |
| | | | | 363/68 |
| 2009/0219737 | A1 | * | 9/2009 | Bjorklund ................. H02J 3/36 |
| | | | | 363/35 |
| 2010/0046255 | A1 | | 2/2010 | Pääjärvi |
| 2014/0247629 | A1 | * | 9/2014 | Crane .................... H02M 1/08 |
| | | | | 363/35 |
| 2015/0171741 | A1 | * | 6/2015 | Sastry .................... H02M 1/10 |
| | | | | 363/40 |
| 2015/0256094 | A1 | * | 9/2015 | Chaudhuri .......... H02M 7/5387 |
| | | | | 363/35 |
| 2017/0331390 | A1 | * | 11/2017 | Xu ...................... H02M 5/4585 |

* cited by examiner

POWER TRANSMISSION VIA A BIPOLAR HIGH-VOLTAGE DC TRANSMISSION LINK

BACKGROUND OF THE INVENTION

Field of the Invention

The invention relates to a converter station for a power transmission via a bipolar high-voltage DC transmission link and to a method for operating same.

Electric power is frequently transmitted between AC grids over long distances using high DC voltage, since power transmission using DC voltage exhibits lower losses and is cheaper in comparison with power transmission using AC voltage over long distances. This type of power transmission is referred to as high-voltage DC (HVDC) transmission. The power transmission can take place via a monopolar or bipolar high-voltage DC transmission link (HVDC link). A monopolar HVDC link has only one high-voltage line, to which a high voltage with reference to a ground potential is applied. A bipolar HVDC link has two high-voltage lines, a high voltage that is positive with reference to a ground potential being applied to one high-voltage line and a high voltage that is negative with reference to the ground potential being applied to the other high-voltage line. The parts of an HVDC link that are assigned to the same voltage polarity are referred to below as poles of the HVDC link. A monopolar HVDC link therefore has one pole and a bipolar HVDC link has two poles.

In order to connect an HVDC link to an AC grid, the AC grid and one end of the HVDC link have a converter station arranged between them in which the conversion between AC current and AC voltage of the AC grid and DC current and DC voltage of the HVDC transmission takes place. Converter stations have one converter for each pole of the HVDC link that is connected to them, said converter frequently being embodied as a thyristor-based line-commutated converter (LCC). These converters operate on the principle of reciprocal current commutation between individual valve units that each have one thyristor or multiple series-connected thyristors. The continuous flow of current is maintained by inductances.

If the flow of current during the conductive period of a valve unit passes through zero, so that the flow of current through this valve unit has already expired before the valve unit taking over from the latter during the current commutation is triggered, the expired valve unit needs to be triggered again, and this is then referred to as intermittent flow. This intermittent flow causes high losses and places very great demands on the converters, which is why it is best avoided during operation. For this reason, line-commutated converters are operated with a minimum flow of current, which is approximately 5 to 10 percent of the rated current, for example, and for which there is certainly no possibility of intermittent flow occurring. At the same time, however, this means that each line-commutated converter has a minimum transmission power that is approximately 5 to 10 percent of the rated power, for example, unless the HVDC transmission voltage is additionally lowered in this operating range, which in turn means increased losses, however.

When a line-commutated converter is switched on (unblocked), a sudden real power change therefore occurs in the transmission grid without further measures, this being accompanied by a sudden reactive power change. These sudden power changes have undesirable side effects and also cause a sudden voltage change that is too large in weak AC grids and needs to be compensated for by means of cost-intensive measures.

One way of decreasing the sudden real power change is to lower the DC voltage of the HVDC transmission for constant current, but this increases losses.

In the case of a bipolar HVDC link, there is also the possibility of decreasing the sudden real power change by using the two poles of the HVDC link to transmit real powers in opposite directions. This involves one of the two converters on each of multiple converter stations connected to the HVDC link being coordinately operated as a rectifier, which takes a converter real power from the AC grid connected to it, while the other converter is operated as an inverter, which transmits a converter real power to the AC grid. In this case, the station real power transmitted by a converter station is the difference between the converter real powers of its two converters. As a result, the station real power can be made lower than the converter real power of each converter and more particularly lower than the minimum transmission power of each converter, so that the sudden real power change can be reduced, even though both converters are operated at at least their minimum transmission power. However, this method has the disadvantage that high transmission losses arise as a result of the transmission of real powers via both poles of the HVDC link.

SUMMARY OF THE INVENTION

The invention is based on the object of specifying a converter station having line-commutated converters for a power transmission via a bipolar HVDC link and a method for operating such a converter station that are improved more particularly in respect of sudden real power changes.

The object is achieved according to the invention by a method as claimed and by a converter station as claimed.

Advantageous refinements of the invention are the subject matter of the subclaims.

The method according to the invention for operating a converter station having two line-commutated converters for a power transmission via a bipolar high-voltage DC transmission link involves, in a first mode of operation, the two converters being electrically connected to the same pole of the high-voltage DC transmission link in an antiparallel connection; one of the converters is operated as a rectifier on an AC grid and the other converter is operated as an inverter on the AC grid. In a second mode of operation, the two converters are connected to different poles of the high-voltage DC transmission link and both converters are operated either as rectifiers or as inverters on the AC grid. In both modes of operation, a station real power exchanged between the converter station and the AC grid is controlled by real power stipulations for converter real powers exchanged between the converters and the AC grid.

The invention thus provides for two different modes of operation for operating a converter station having two line-commutated converters on a bipolar HVDC link. In a first mode of operation, the converters in an antiparallel connection are monopolar, that is to say operated on the same pole of the HVDC link. In this mode of operation, one of the converters is operated as a rectifier on the AC grid, that is to say that this converter takes real power from the AC grid. The other converter is operated as an inverter on the AC grid, that is to say that this converter transmits real power to the AC grid. In the second mode of operation, the two converters are operated in a conventional manner in which they are connected to different poles of the high-voltage DC transmission link and both converters are operated either as rectifiers or as inverters on the AC grid.

In the first mode of operation, the station real power that the converter station exchanges with the AC grid is the difference between the converter real powers of the two converters, since one of the converters is operated as a rectifier and the other converter is operated as an inverter. As a result, the station real power can be made lower than the converter real power of each converter and more particularly lower than the minimum transmission power of each converter, even if both converters are operated at at least their minimum transmission power. More particularly, an extremely low station real power can be set if both converters are operated at identical converter real powers. The first mode of operation is therefore suitable more particularly for switching on and switching off the converter station, in order to reduce or totally avoid a sudden real power change caused when switching on or switching off. Since the station real power and the power transmitted via the HVDC link can be low at high converter real powers in the first mode of operation, the first mode of operation is furthermore suitable for tests at high converter real powers when an HVDC installation is commissioned, even if the AC systems and/or the HVDC link are not yet designed or available for high powers.

In the second mode of operation, the station real power that the converter station exchanges with the AC grid is the sum of the converter real powers of the two converters, since both converters are operated either as rectifiers or as inverters. This mode of operation is therefore suitable for transmitting high real powers via the HVDC link.

In both modes of operation, the converter station is controlled by real power stipulations for the converter real powers exchanged between the converters and the AC grid. In the first mode of operation, the real power stipulations for the two converters normally differ from one another, but in certain situations can also be concordant, more particularly in order to set an extremely low station real power, for example in order to switch the converter station on or off without a sudden real power change. In the second mode of operation, both converters are usually operated using concordant real power stipulations, so that each converter real power is half the magnitude of the station real power. However, the two converters can also be operated using different real power stipulations in the second mode of operation.

Besides the conventional (second) mode of operation of the converter station, in which the two converters are operated on different poles of the HVDC link both either as rectifiers or as inverters, the invention thus allows a further (first) mode of operation, in which the converter station can be operated at low station real powers and more particularly switched on and off with reduced effects on the AC grid.

One refinement of the invention provides for a change of mode of operation between the two modes of operation to result in first one of the two converters being switched off and at the same time the converter real power of the other converter being set to the station real power realized before the change of mode of operation, then the switched-off converter being isolated from that pole to which it was connected before it was switched off and being connected to the other pole, and finally the switched-off converter being switched on and the converter station being operated in the changed mode of operation at the same station real power as before the change of mode of operation. This refinement of the invention allows a sudden real power change caused by a change of the mode of operation to be avoided in the station real power.

A further refinement of the invention provides for a threshold value for the station real power to be prescribed and for the converter station to be operated in the first mode of operation for station real powers below the threshold value. Above the threshold value, the converter station is operated in the second mode of operation, for example. This refinement of the invention makes allowance for the first mode of operation being suitable particularly for low station real powers, since the station real power is the difference between the converter real powers of the two converters in this mode of operation. More particularly, a station real power that is lower than a minimum transmission power of the converters that is used to avoid intermittent flow in the converters can be set in the first mode of operation. The threshold value is for example equal to the sum of the minimum transmission powers of the converters of the converter station or greater than this sum.

Further refinements of the invention provide for the station real power to be increased from a switched-on real power by smoothly changing the real power stipulations when the converter station is switched on in the first mode of operation and/or for the station real power to be lowered to a switched-off real power by smoothly changing the real power stipulations when the converter station is switched off in the first mode of operation. The switched-on real power and/or the switched-off real power can be more particularly zero. These refinements of the invention allow soft switching-on and/or switching-off of the converter station without sudden real power changes or with sudden real power changes that are reduced in comparison with conventional operation.

A further refinement of the invention provides for the converter station to be operated in the first mode of operation for a change in a direction of flow of the station real power, wherein the station real power is changed by smoothly changing the real power stipulations. The effect of this refinement of the invention is that the station real power is changed continuously when its direction of flow changes, and sudden real power changes are avoided in the station real power.

A converter station according to the invention for a power transmission via a bipolar high-voltage DC transmission link comprises two line-commutated converters that in each case are operable either as a rectifier or as an inverter on an AC grid and electrically connectable to each of the two poles of the high-voltage DC transmission link, and a control unit configured to control a station real power taken from the AC grid by the converter station by means of real power stipulations for converter real powers exchanged between the converters and the AC grid in accordance with the method according to the invention.

A converter station according to the invention allows performance of the method according to the invention with the aforementioned advantages. In comparison with a conventional converter station having line-commutated converters, only one circuit, allowing anti-parallelization of the two converters, and a control unit, configured to control the converter real powers of the antiparallel-connected converters in a manner according to the invention, are needed. Any already existing switching apparatuses of a converter station can be used for the circuit, an insulation level of these switching apparatuses needing to be increased to a high-voltage potential if required. Setup of the control unit can be realized by means of appropriate programming, for example.

The additional hardware complexity for a converter station according to the invention is therefore relatively low in comparison with a conventional converter station having line-commutated converters. The invention can therefore also be used for upgrading existing bipolar converter stations having line-commutated converters if need be.

One refinement of a converter station according to the invention provides for each converter to be connectable to one pole of the high-voltage DC transmission link directly and to the other pole by means of a pole changing switch. This refinement of the invention is particularly advantageous if the converter station is connected to more than one further converter station via an HVDC link (known as multiterminal operation), since simple polarity reversal of the HVDC link is not possible in this case and there is therefore often provision for pole changing switches anyway.

A further refinement of the invention provides for the AC grid to be a three-phase AC grid. In this case, each converter can have for example twelve valve units arranged in a twelve-pulse bridge circuit consisting of two six-pulse bridge circuits, wherein each valve unit can have more particularly at least one thyristor. Furthermore, each converter can be connected to the AC grid by a transformer unit that has a primary winding, a first secondary winding and a second secondary winding for each phase of the AC grid, wherein the primary windings are connected to one another by a star connection, the first secondary windings are connected to one another by a delta connection, and the second secondary windings are connected to one another by a star connection. The aforementioned refinements of the invention relate to the prevailing design of HVDC links between three-phase AC grids. In these cases, more particularly converter stations having twelve-pulse converters and the further aforementioned properties have proved their worth, these therefore also being advantageous refinements of the present invention. However, it should be emphasized that the invention is not limited to three-phase AC grids and/or converters of the aforementioned type, but is also applicable to single-phase AC grids and/or six-pulse converters, for example.

The properties, features and advantages of this invention that are described above and the manner in which they are achieved will become clearer and more distinctly comprehensible in association with the description of exemplary embodiments that follows, these being explained in more detail in association with the drawings, in which:

DETAILED DESCRIPTION OF THE INVENTION

Mutually corresponding parts are provided with the same reference signs in the figures.

Figure 1:
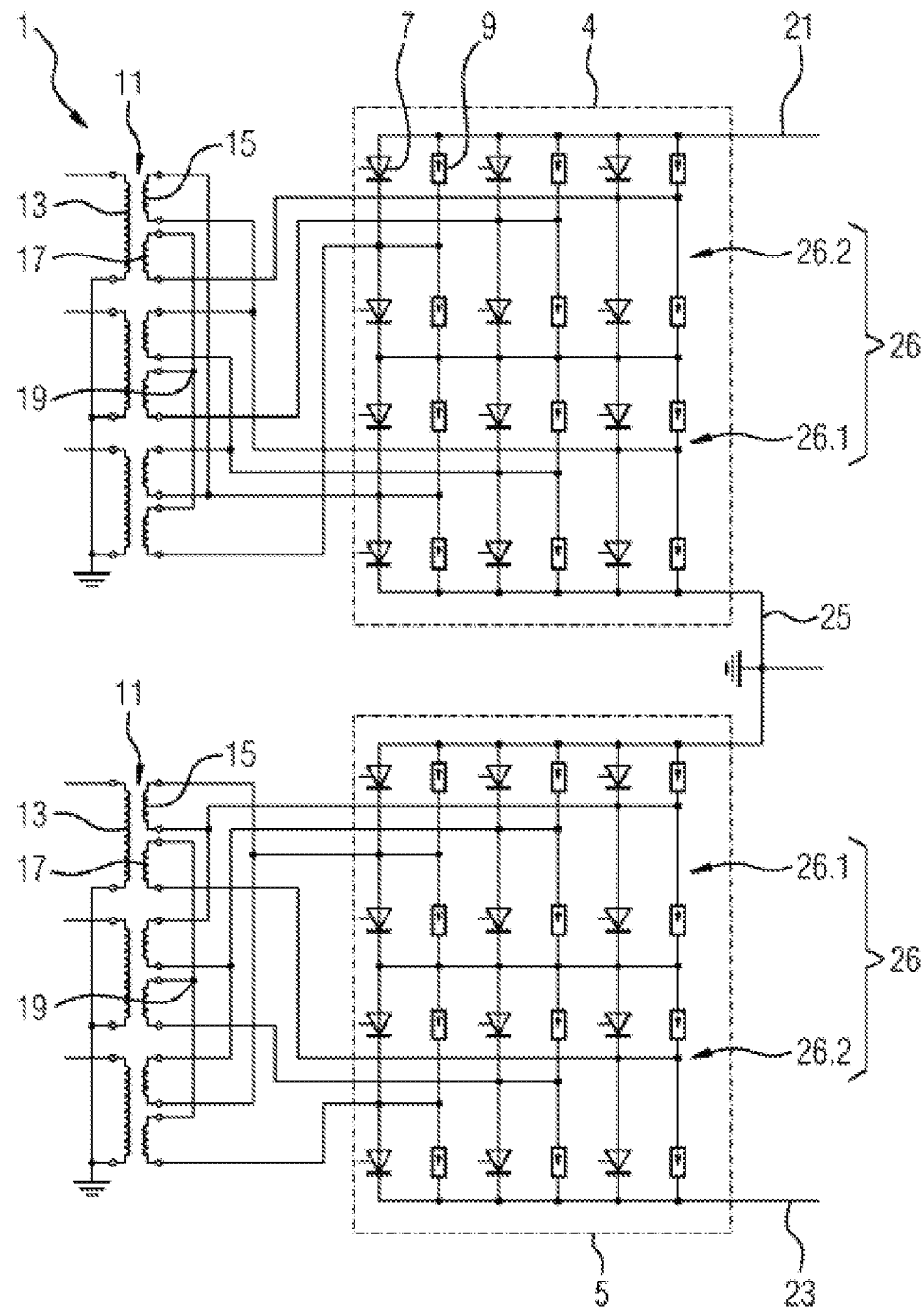
FIG. 1 shows a circuit diagram for a converter station based on the prior art.

FIG. 1 shows a circuit diagram for a converter station 1 based on the prior art for a power transmission via a bipolar HVDC link 30. The converter station 1 comprises two line-commutated converters 4, 5 (LCC) that are each operable either as a rectifier or as an inverter on a three-phase AC grid 27, 28, 29.

Each converter 4, 5 has twelve valve units 7 arranged in a twelve-pulse bridge circuit 26 consisting of two six-pulse bridge circuits 26.1, 26.2. Each valve unit 7 has one thyristor or multiple series- or parallel-connected thyristors. Each valve unit 7 has a surge arrester 9 connected in parallel with it.

Each converter 4, 5 is connected to the AC grid 27 by a transformer unit 11 that has a primary winding 13, a first secondary winding 15 and a second secondary winding 17 for each phase of the AC grid 27. The primary windings 11 of each transformer unit 11 are connected to one another by a star connection, the first secondary windings 15 are connected to one another by a delta connection, and the second secondary windings 17 are connected to one another by a star connection.

Each winding end of each first secondary winding 15 is connected to a first six-pulse bridge circuit 26.1 formed by six valve units 7. A winding end of each second secondary winding 17 that is averted from a star point 19 of the star connection is connected to a second six-pulse bridge circuit 26.2 formed by the other six valve units 7 of the respective converter 4, 5.

A first converter 4 is connected to a first pole 21 of the HVDC link 30. To this end, the second six-pulse bridge circuit 26.2 of the first converter 4 is connected to the first pole 21 of the HVDC link 30. The second converter 5 is connected to the second pole 23 of the HVDC link 30. To this end, the second six-pulse bridge circuit 26.2 of the second converter 5 is connected to the second pole 23 of the HVDC link 30. Furthermore, the two converters 4, 5 are connected to one another via a converter connecting line 25 designed for medium voltage. To this end, the first six-pulse bridge circuits 26.1 of both converters 4, 5 are connected to the converter connecting line 25.

Figure 2:
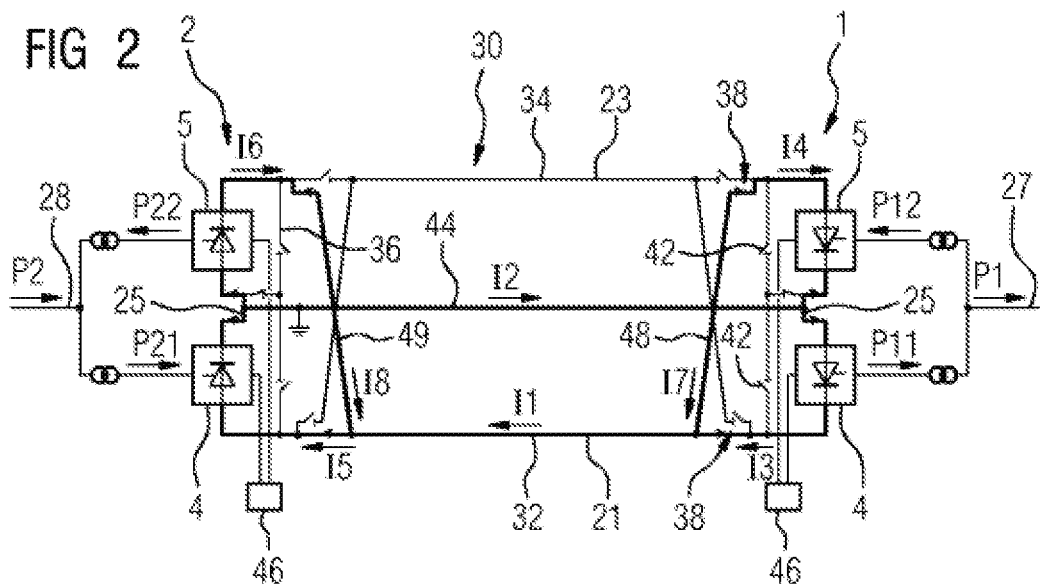
FIG. 2 schematically shows two converter stations connected via an HVDC link.

FIG. 2 schematically shows two converter stations 1, 2 connected to one another on the DC side via an HVDC link 30. On the AC side, a first converter station 1 is connected to a first AC grid 27 and the second converter station 2 is connected to a second AC grid 28.

The HVDC link 30 is in bipolar form with a first pole 21 and a second pole 23 and high-voltage lines 32, 34 between the two converter stations 1, 2.

Each converter station 1, 2 is designed in the manner of the converter station 1 depicted in FIG. 1, each of the two converters 4, 5 of each converter station 1, 2 being selectively connectable to each of the two poles 21, 23 of the HVDC link 30. To this end, the outputs of each converter station 1, 2 that are connected to a respective pole 21, 23 are connectable to one another via a pole connecting line 36 and two interrupters 42 or via pole changing lines 48, 49 and two pole changing switches 38. The pole connecting line 36 of each converter station 1, 2 is furthermore connectable to the converter connecting line 25 of the converter station 1, 2 via a reconfiguration switch 40. The converter connecting lines 25 of the converter stations 1, 2 are connected to one another via a medium-voltage line 44. Each converter station 1, 2 has a control unit 46 that actuates the valve units 7 of its converters 4, 5.

Each converter station 1, 2 exchanges a station real power P1, P2 with the AC grid 27, 28 to which it is connected, Pi denoting the station real power of the converter station i (for i=1, 2). The station real power Pi of the converter station i is obtained from the converter real power Pi1 of the first converter 4 of the converter station i and the converter real power Pi2 of the second converter 5 of the converter station i. The direction of each flow of real power is depicted in FIG. 2 by an arrow.

In the case depicted in FIG. 2, both converter stations 1, 2 are operated in the first mode of operation of the method according to the invention. The two converters 4, 5 of each converter station 1, 2 are connected to the first pole 21 of the HVDC link 30 in an antiparallel connection, wherein the first converter 1 of each converter station 1, 2 is connected to the first pole 21 directly, while the second converter 5 is connected to the first pole 21 by means of a pole changing switch 38. The converter stations 1, 2 are thus each operated in monopolar fashion in the first mode of operation, that is to say only on one pole 21 of the HVDC link 30.

One of the converters 4, 5 of each converter station 1, 2 is operated as a rectifier; the other converter 4, 5 of the converter station 1, 2 is operated as an inverter.

In the example depicted, the first converter 4 of a first converter station 1 is operated as an inverter, that is to say that it transmits the converter real power P11 to the first AC grid 27. The second converter 5 of the first converter station 1 is operated as a rectifier, that is to say that it takes the converter real power P12 from the first AC grid 27. In the example depicted, it is assumed that P11 is greater than P12, which means that the first converter station 1 transmits the station real power P1=P11−P12 to the first AC grid 27.

The first converter 4 of the second converter station 2 is operated as a rectifier, that is to say that it takes the converter real power P21 from the second AC grid 28. The second converter 5 of the second converter station 2 is operated as an inverter, that is to say that it transmits the converter real power P22 to the second AC grid 28. In the example depicted, it is assumed that P21 is greater than P22, which means that the second converter station 2 takes the station real power P2=P21−P22 from the second AC grid 28.

The station real power P1, P2 of each converter station 1, 2 is controlled by means of the control unit 46 of this converter station 1, 2 by means of real power stipulations for the converter real powers P11, P12, P21, P22. Identical real power stipulations for both converters 4, 5 of each converter station 1, 2, that is to say for P11=P12 and P21=P22, allow more particularly extremely low station real powers P1, P2, that is to say P1=0 and P2=0, to be set.

FIG. 2 additionally mentions electric currents I1 to I8 and the directions thereof, depicted by arrows, which each flow through a first high-voltage line 32, the medium-voltage line 44, the converters 4, 5 of both converter stations 1, 2 and pole changing lines 48, 49. In the example depicted, the current I3 flowing through the first converter 4 of the first converter station 1 is split into the currents I1, I7 flowing through the first high-voltage line 32 and the pole changing line 48, for example. In comparison with the method described at the outset, in which a sudden real power change when switching converter stations 1, 2 on or off is avoided by virtue of the two high-voltage lines 32, 34 of the HVDC link 30 being used to transmit real powers in opposite directions at extremely low station real powers P1, P2, a power loss arising as a result of a flow of current through the high-voltage line 32 is advantageously decreased in this case. In the specific case of extremely low station real powers P1, P2, that is to say for P1=0 and P2=0, power losses arising as a result of currents I1, I2 through the high-voltage line 32 and the medium-voltage line 44 can even be avoided completely, since these currents I1, I2 disappear in this specific case.

Figure 3:
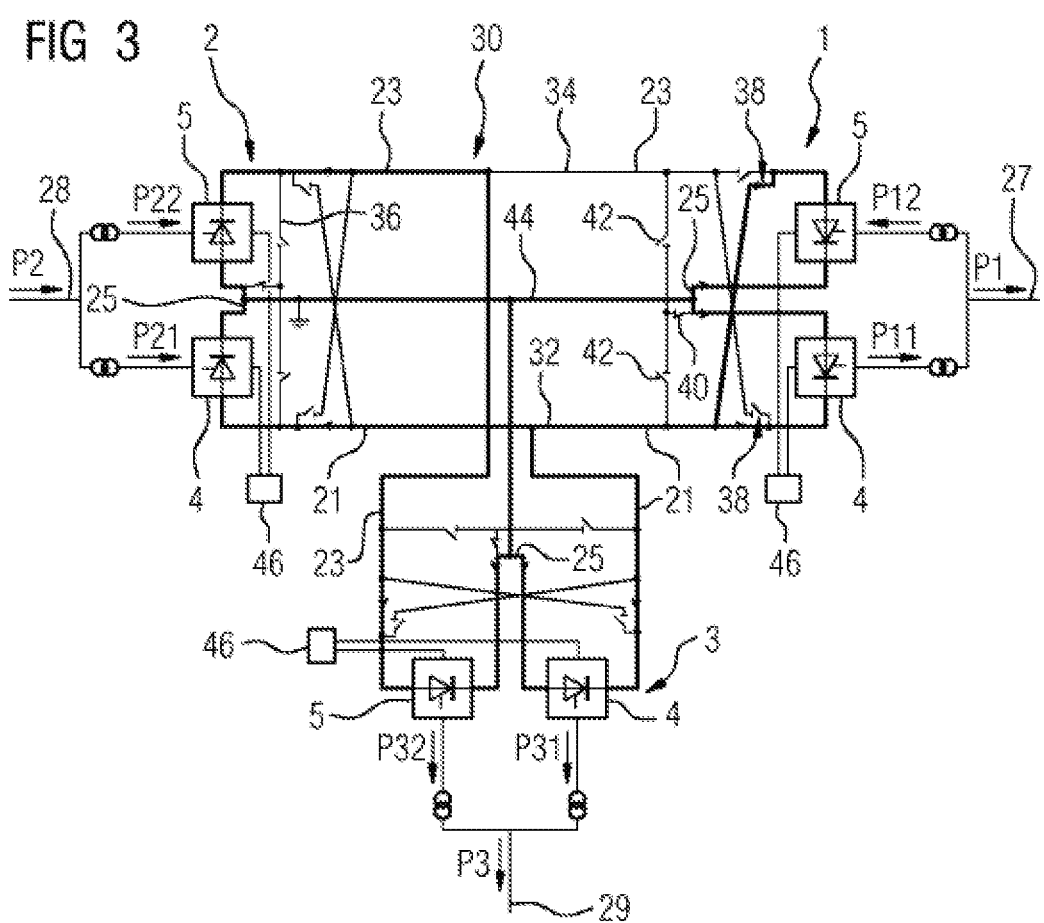
FIG. 3 schematically shows three converter stations connected via an HVDC link.

FIG. 3 schematically shows three converter stations 1, 2, 3 connected to one another on the DC side via an HVDC link 30. On the AC side, a first converter station 1 is connected to a first AC grid 27, a second converter station 2 is connected to a second AC grid 28, and the third converter station 3 is connected to a third AC grid 29.

The HVDC link 30 is in bipolar form with a first pole 21 and a second pole 23. The converter stations 1, 2, 3 are connected to one another via high-voltage lines 32, 34.

Each converter station 1, 2, 3 is designed in the manner of the converter station 1 depicted in FIG. 1, each of the two converters 4, 5 of each converter station 1, 2, 3 being selectively connectable to each of the two poles 21, 23 of the HVDC link 30. To this end, the outputs of each converter station 1, 2, 3 that are connected to a respective pole 21, 23 are connectable to one another via a pole connecting line 36 and two interrupters 42 or via pole changing lines 48, 49 and two pole changing switches 38. The pole connecting line 36 of each converter station 1, 2, 3 is furthermore connectable to the converter connecting line 25 of the converter station 1, 2, 3 via a reconfiguration switch 40 and has an interrupter 42 between its connection to the reconfiguration switch 40 and each converter 4, 5 of the converter station 1, 2, 3. The converter connecting lines 25 of the converter stations 1, 2, 3 are connected to one another via medium-voltage lines 44. Each converter station 1, 2, 3 has a control unit 46 that actuates the valve units 7 of its converters 4, 5.

Each converter station 1, 2, 3 exchanges a station real power P1, P2, P3 with the AC grid 27, 28, 29 to which it is connected, Pi denoting the station real power of the converter station i (for i=1, 2, 3). The station real power Pi of the converter station i is obtained from the converter real power Pi1 of the first converter 4 of the converter station i and the converter real power Pi2 of the second converter 5 of the converter station i. The direction of each flow of real power is again depicted by an arrow.

A first converter station 1 is operated in the first mode of operation of the method according to the invention. The two converters 4, 5 of the first converter station 1 are connected to the same first pole 21 of the HVDC link 30 in an antiparallel connection, wherein the first converter 4 of the first converter station 1 is connected to the first pole 21 directly, while the second converter 5 of the first converter station 1 is connected to the first pole 21 by means of a pole changing switch 38. The first converter 4 is operated as an inverter, that is to say that it transmits the converter real power P11 to the first AC grid 27. The second converter 5 is operated as a rectifier, that is to say that it takes the converter real power P12 from the first AC grid 27. In the example depicted, it is assumed that P11 is greater than P12, which means that the first converter station 1 transmits the station real power P1=P11−P12 to the first AC grid 27.

A second converter station 2 and the third converter station 3 are each operated in a conventional second mode of operation, that is to say that the two converters 4, 5 of each of these converter stations 2, 3 are connected to different poles 21, 23 of the HVDC link 30 and both converters 4, 5 are operated either as rectifiers or as inverters.

In the example depicted, the two converters 4, 5 of the second converter station 2 are operated as rectifiers that each take a converter real power P21 and P22 from the second AC grid 28. The second converter station 2 therefore takes the station real power P2=P21+P22 from the second AC grid 28.

The two converters 4, 5 of the third converter station 3 are operated as inverters that each transmit a converter real power P31 and P32 to the third AC grid 29. The third converter station 3 therefore transmits the station real power P3=P31+P32 to the third AC grid 29.

The station real power P1, P2, P3 of each converter station 1, 2 is controlled by means of the control unit 46 of this converter station 1, 2 by means of real power stipulations for the converter real powers P11, P12, P21, P22, P31, P32 of its converters 4, 5.

In the examples depicted in FIGS. 2 and 3, the station real power P1, P2, P3 of a converter station 1, 2, 3 in the first mode of operation is the difference between the converter real powers P11 to P32 of the two converters 4, 5 of the converter station 1, 2, 3. Therefore, the station real power P1, P2, P3 in the first mode of operation can be made lower than the converter real power P11 to P32 of each converter 4, 5 and more particularly lower than a minimum transmission power that prevents intermittent flow in the converter 4, 5, even if both converters 4, 5 are operated at at least their minimum transmission power. More particularly, an extremely low station real power P1, P2, P3 of a converter station 1, 2, 3 can also be set by virtue of both converters 4, 5 of the converter station 1, 2, 3 being operated at identical converter real powers P11 to P32.

The first mode of operation is therefore preferably used for low station real powers P1, P2, P3 of the converter stations 1, 2, 3. By way of example, a threshold value for the station real power P1, P2, P3 of a converter station 1, 2, 3 is prescribed and the converter station 1, 2, 3 is operated in the first mode of operation for station real powers P1, P2, P3 below the threshold value. The threshold value is for example equal to the sum of the minimum transmission powers of the converters 4, 5 of the converter station 1, 2, 3 or greater than this sum. For station real powers P1, P2, P3 above the threshold value, the converter station 1, 2, 3 is preferably operated in the second mode of operation.

A change of mode of operation between the two modes of operation of a converter station 1, 2, 3 results in first one of the two converters 4, 5 of the converter station 1, 2, 3 being switched off and at the same time the converter real power P11 to P32 of the other converter 4, 5 being set to the station real power P1, P2, P3 realized before the change of mode of operation. The switched-off converter 4, 5 is then isolated from that pole 21, 23 to which it was connected before it was switched off and is connected to the other pole 21, 23. Finally, the switched-off converter 4, 5 is switched on again and the converter station 1, 2, 3 is operated in the changed mode of operation at the same station real power P1, P2, P3 as before the change of mode of operation. In this way, a sudden real power change caused by a change of the mode of operation is avoided in the station real power P1, P2, P3.

The first mode of operation is used more particularly for switching on and switching off a converter station 1, 2, 3, in order to reduce or totally avoid a sudden real power change caused by switching on or switching off. Furthermore, switching on a converter station 1, 2, 3 results in the station real power P1, P2, P3 of the converter station 1, 2, 3 being increased from a switched-on real power, preferably by smoothly changing the real power stipulations for the converter real powers P11 to P32, in the first mode of operation. Switching off the converter station 1, 2, 3 results in the station real power P1, P2, P3 being lowered to a switched-off real power by smoothly changing the real power stipulations for the converter real powers P11 to P32 in the first mode of operation. The switched-on real power and/or the switched-off real power can be more particularly zero. This allows soft switching-on and switching-off of a converter station 1, 2, 3 without sudden real power changes.

The first mode of operation of a converter station 1, 2, 3 is furthermore preferably used for changing a direction of flow of the station real power P1, P2, P3. In this case too, the station real power P1, P2, P3 is preferably changed by smoothly changing the real power stipulations, so that the station real power P1, P2, P3 is continuously changed even when its direction of flow changes, and sudden real power changes are avoided in the station real power P1, P2, P3.

Although the invention has been illustrated and described more specifically in detail by means of preferred exemplary embodiments, the invention is not limited by the disclosed examples, and other variations can be derived therefrom by a person skilled in the art without departing from the scope of protection of the invention.

LIST OF REFERENCE SIGNS 1 to 3 converter station
4, 5 converter
7 valve unit
9 surge arrester
11 transformer unit
13 primary winding
15, 17 secondary winding
19 secondary-side star point
21, 23 pole
25 converter connecting line
26 twelve-pulse bridge circuit
26.1, 26.2 six-pulse bridge circuit
27 to 29 AC grid
30 high-voltage DC transmission link
32, 34 high-voltage line
36 pole connecting line
38 pole changing switch
40 reconfiguration switch
42 interrupter
44 medium-voltage line
46 control unit
48, 49 pole changing line
I1 to I8 current
P1 to P3 station real power
P11 to P32 converter real power

The invention claimed is:

1. A method of operating a converter station having two line-commutated converters for power transmission via a bipolar high-voltage DC transmission link, the method comprising:
  in a first mode of operation, electrically connecting the two converters to one pole of the high-voltage DC transmission link in an antiparallel connection, and operating one of the converters as a rectifier on an AC grid and operating another of the converters as an inverter on the AC grid;
  in a second mode of operation, connecting the two converters to different poles of the high-voltage DC transmission link and operating both converters either as rectifiers or as inverters on the AC grid;
  in the first and second modes of operation, controlling a station real power exchanged between the converter station and the AC grid by real power stipulations for converter real powers exchanged between the two converters and the AC grid; and
  prescribing a threshold value for the station real power and operating the converter station in the first mode of operation for station real powers below the threshold value.

2. The method according to claim 1, wherein a change of mode of operation between the first and second modes of operation comprises:

first switching off one of the two converters and at the same time setting the converter real power of the other converter to the station real power realized before the change of mode of operation;

then isolating the switched-off converter from that pole to which the converter was connected before it was switched off and connecting the switched-off converter to the other pole; and finally turning on the switched-off converter and operating the converter station in a changed mode of operation at the same station real power as before the change of mode of operation.

3. The method according to claim 1, which comprises operating the converter station in the second mode of operation for station real powers above the threshold value.

4. The method according to claim 1, which comprises increasing the station real power from a switched-on real power by smoothly changing the real power stipulations when the converter station is switched on in the first mode of operation.

5. The method according to claim 4, wherein the switched-on real power is zero.

6. The method according to claim 1, which comprises lowering the station real power to a switched-off real power by smoothly changing the real power stipulations when the converter station is switched off in the first mode of operation.

7. The method according to claim 6, wherein the switched-off real power is zero.

8. The method according to claim 1, which comprises operating the converter station in the first mode of operation for a change in a direction of flow of the station real power, and changing the station real power by smoothly changing real power stipulations.

9. A converter station for power transmission via a high-voltage DC transmission link having two poles, the converter station comprising two line-commutated converters each being operable either as a rectifier or as an inverter on an AC grid and being electrically connectable to each of the two poles of the high-voltage DC transmission link; and a control unit configured to control a station real power taken from the AC grid by the converter station by way of real power stipulations for converter real powers exchanged between the converters and the AC grid in accordance with the method according to claim 1.

10. The converter station according to claim 9, wherein each of said converters is connectable to one pole of the high-voltage DC transmission link directly and to another pole by way of a pole changing line and a pole changing switch or by way of a pole connecting line and interrupters.

11. The converter station according to claim 10, wherein the AC grid is a three-phase AC grid.

12. The converter station according to claim 11, wherein each of said converters has twelve valve units arranged in a twelve-pulse bridge circuit consisting of two six-pulse bridge circuits.

13. The converter station according to claim 12, wherein each of said valve units has at least one thyristor.

14. The converter station according to claim 11, wherein:

each of said converters is connected to the AC grid by a transformer unit with a primary winding, a first secondary winding, and a second secondary winding for each phase of the AC grid; and said primary windings of said converters are connected to one another by a star connection, said first secondary windings of said converters are connected to one another by a delta connection, and said second secondary windings of said converters are connected to one another by a star connection.

* * * * *